E. C. REYNOLDS.
BEET BLOCKER.
APPLICATION FILED MAY 29, 1911.
1,017,316.
Patented Feb. 13, 1912.
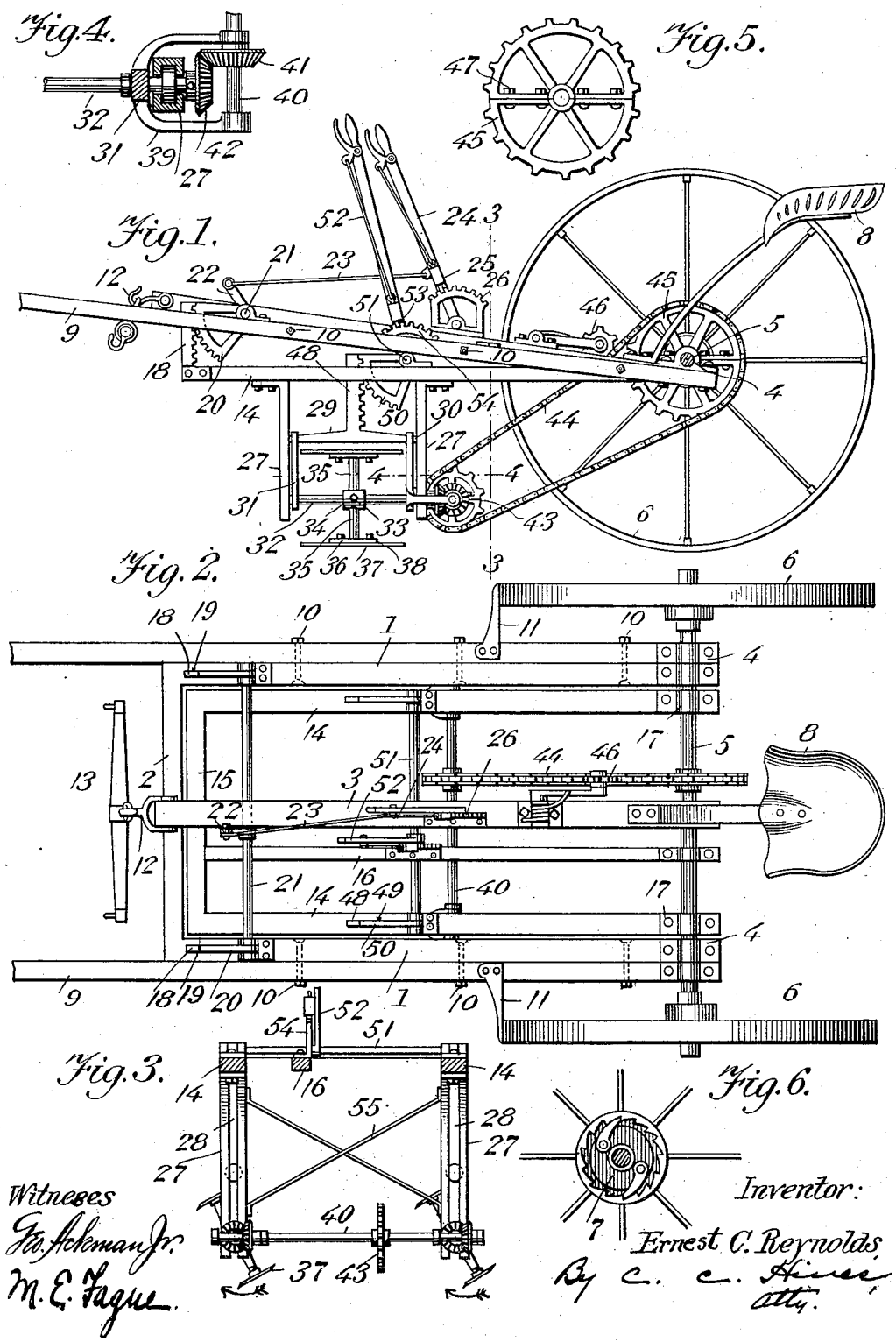
Witnesses
Geo. Ackman Jr.
M. E. Tague
Inventor:
Ernest C. Reynolds
By C. C. Hines
atty.

UNITED STATES PATENT OFFICE.

ERNEST C. REYNOLDS, OF SANFORD, COLORADO.

BEET-BLOCKER.

1,017,316.  Specification of Letters Patent.  Patented Feb. 13, 1912.

Application filed May 29, 1911. Serial No. 630,054.

*To all whom it may concern:*

Be it known that I, ERNEST C. REYNOLDS, a citizen of the United States, residing at Sanford, in the county of Conejos and State of Colorado, have invented certain new and useful Improvements in Beet-Blockers, of which the following is a specification.

This invention relates to beet blockers and like agricultural implements, the object of the invention being to provide an implement of this character which will operate upon two rows of plants at a time and sweep the cuttings into the space between the rows, so that the refuse may be readily gathered.

A further object of the invention is to provide a blocker in which rotary cutters are employed which operate at right angles to the line of draft and are adjustable relative to the ground surface to cut as deeply as desired.

A further object of the invention is to provide cutters with reversible knives and which are carried by a frame vertically adjustable relative to the main frame, whereby the cutters may be kept level irrespective of the height of the draft animal employed.

The invention consists of the features of construction, combination and arrangement of parts fully described and claimed, reference being had to the accompanying drawing, in which:—

Figure 1 is a side elevation of a beet blocker embodying my invention. Fig. 2 is a top plan view of the same. Fig. 3 is a transverse section on line 3—3 of Fig. 1. Fig. 4 is a detail section on line 4—4 of Fig. 1. Fig. 5 is a side view of one of the sprocket wheels. Fig. 6 is a section through the main axle showing the clutch connection between the same and one of the supporting wheels.

The implement comprises a main frame shown in the present instance as consisting of longitudinal side bars 1, a front cross bar 2 and a central longitudinal bar 3, said bars being provided at their rear ends with bearings 4 for a transverse shaft or axle 5 carrying supporting wheels 6, the frame thus being mounted to tilt vertically on the shaft. Each wheel 6 has the usual clutch connection 7, in the form of a pawl and ratchet device, for permitting retrograde movement thereof to facilitate turning of the implement. A driver's seat 8 is mounted upon the rear end of the bar 3 and shafts or thills 9 are suitably secured to the side bars 1, as by bolts 10. Scrapers 11 are provided to keep the wheels clear of soil, and a clevis 12 is mounted upon the cross bar 2 or forward end of the bar 3 for the attachment of a swingletree 13.

A vertically movable frame is provided to support the cutters, said frame comprising side bars 14, a front cross bar 15 and an intermediate longitudinal bar 16, said bars 14 and 16 carrying bearing members 17 at their rear ends which engage the axle and permits said vertically movable cutter carrying frame to be adjusted on the axle as a center of movement. Toothed bars or racks 18 are secured to the side bars of the adjustable frame and are movable in guide slots 19 in the bars 1 and engage toothed segments 20 carried by a transverse shaft 21 journaled on the main frame. This shaft is provided with a crank arm 22 connected by a link 23 with an operating lever 24, whereby the shaft may be rocked to adjust the cutter carrying frame vertically with respect to the main frame. The lever 24 carries a pawl 25 to engage a rack 26 on the main frame, whereby said lever and the adjustable cutter carrying frame may be secured in adjusted position.

Depending from each side bar 14 of the cutter carrying frame is a pair of guide bars or arms 27, arranged one in advance of the other, and provided with guide slots 28. Adjustably mounted on each of these pairs of arms is a cutter supporting bracket consisting of a head piece 29 provided with guide members 30 engaging the slots 28 and carrying a pair of spaced depending arms 31, in the lower ends of which are journaled the ends of a shaft 32 which turn in boxes slidably engaging the guide slots 28. Centrally secured to the shaft 32, as by a set screw 33, is a sleeve 34 provided with oppositely projecting arms 35 carrying cross heads 36 to which are secured cutter blades 37 by means of screws or bolts 38. It will be observed that the two rotary cutters thus mounted are arranged on opposite sides of the line of draft or longitudinal center of the machine to cut in planes at right angles thereto. The cutting blades are beveled at their inner and outer edges on opposite sides thereof, so that when the acting cutting edges become dull the blades may be reversed to bring the opposite cutting edges into action. The cutters rotate in the direction indicated by the arrows in Fig. 3, so that they will sweep the cuttings from the rows into the space between the same, allowing the refuse to be readily gathered and removed.

The rear ends of the shafts 32 extend beyond the rear guides 27 and carry brackets or yokes 39 having bearings for the ends of a transverse transmission shaft 40. On this shaft 40 are beveled gears 41 meshing with similar gears 42 on the shafts 32, whereby the latter are driven. On said shaft 40 is also a sprocket wheel 43 connected by a driving chain 44 with a drive sprocket 45 on the driving axle 5, through which, in the travel of the implement, motion is communicated to the transverse shaft to drive the rotary cutters. A spring actuated idler or tightener 46 is arranged upon the main frame to engage the upper stretch of the chain and hold the same taut. For convenience in applying and removing the sprocket wheels, each sprocket wheel is formed in sections, as shown in Fig. 5, which are secured together and fixed to the shaft by means of screws or bolts 47. Different sizes of sprocket wheels may be employed according to the rate of speed at which the cutters are to be driven, and in such event the tightener 46 will operate to take up any slack which may exist in the chain 44 and to maintain the same taut for a proper driving action at all times. The detachability of the cutting knives also permits different sizes of knives to be employed, according to the area which it is desired to cut out on each cutting action of the knives.

Rack bars 48 extend upwardly from the head pieces 29 of the cutter carrying brackets and project through guide slots 49 in the bars 14 of the carrier frame, said rack bars being engaged by toothed segments 50 mounted on a transverse shaft 51 journaled on said carrier frame. To this shaft is connected an operating lever 52, whereby the shaft may be rocked to vertically adjust the cutters on the carrier frame so that the blades will cut at any desired depth. The lever 52 is provided with a pawl 53 to engage a rack 54 on the cutter carrier frame, whereby said lever and the cutter supporting brackets may be secured in any of their positions of adjustment. Cross braces 55 connect the front and rear transverse pairs of bars 27, by which said bars are rigidly united and firmly and securely stayed.

In operation the implement is drawn by means of a draft animal which walks between the rows of beets which are to be blocked, the cutters operating as the implement travels over the field to cut off plants at desired intervals and sweep the refuse into the space between the rows. The purpose of making the cutter carrying frame adjustable is to compensate for variations in the height of the main frame or the different degrees to which it may be tilted to accommodate different sizes of draft animals, such adjustment permitting the cutters to be maintained in a level position and substantially at the desired distance from the ground surface. The cutters themselves are, however, made vertically adjustable in order that a fineness of adjustment may be obtained, irrespective of the level of the main or cutter carrying frames, to position the cutters for an effective operation.

It will be apparent from the foregoing description that the implement is simple of construction, rapid and efficient in action, and comparatively inexpensive of production, and the advantages arising from the mode of mounting and adjusting the cutters will be readily understood and appreciated.

Having thus described the invention, what I claim is:

1. A beet blocker comprising a main driving axle, a main frame pivotally mounted thereon and provided with a draft attachment, an auxiliary frame pivotally mounted for vertical adjustment independently of the main frame, means for adjusting said auxiliary frame, cutters mounted on the auxiliary frame to rotate in planes at right angles to the line of draft, said cutters being arranged on opposite sides of the longitudinal center of the implement, and means for vertically adjusting said cutters upon the auxiliary frame.

2. A beet blocker comprising a main driving axle, a main frame pivotally mounted thereon and provided with a draft attachment, a vertically adjustable auxiliary frame, means for adjusting the same, depending supports on said adjustable frame, cutters vertically adjustable upon said supports and arranged on opposite sides of the longitudinal center of the implement to rotate at right angles to the line of draft, a shaft in gear with the cutters and vertically adjustable therewith, means for adjusting said cutters and shaft, and gearing between said shaft and the main driving axle.

3. A beet blocker comprising a main driving axle, a main frame pivotally mounted thereon and provided with a draft attachment, a pivoted vertically adjustable auxiliary frame, a crank shaft, rack gearing between said crank shaft and auxiliary frame, means for actuating said gearing to adjust said auxiliary frame, supports depending from the opposite sides of the auxiliary frame, brackets vertically adjustable upon said supports, rotary cutters carried by the brackets, a shaft in gear with the rotary cutters and vertically adjustable therewith, a second crank shaft, rack gearing between the same and said brackets, means for operating said gearing to adjust the cutters and shaft, and a driving connection between the shaft and the main driving axle.

In testimony whereof I affix my signature in presence of two witnesses.

ERNEST C. REYNOLDS.

Witnesses:
 JULIA M. WHITNEY,
 IRENE WHITNEY.

Copies of this patent may be obtained for five cents each, by addressing the "Commissioner of Patents, Washington, D. C."